(12) United States Patent
Diamond et al.

(10) Patent No.: US 11,648,717 B2
(45) Date of Patent: May 16, 2023

(54) SYSTEM AND METHOD FOR MOULDING A TUFTED BODY WITH A CURVED OUTER SURFACE

(71) Applicant: GlaxoSmithKline Consumer Healthcare (UK) IP Limited, Middlesex (GB)

(72) Inventors: David Diamond, Cascais (PT); Jean Diamond, Cascais (PT)

(73) Assignee: GLAXOSMITHKLINE CONSUMER HEALTHCARE (UK) IP LIMITED, Brentford (GB)

( * ) Notice: Subject to any disclaimer, the term of this patent is extended or adjusted under 35 U.S.C. 154(b) by 431 days.

(21) Appl. No.: 16/072,200

(22) PCT Filed: Jan. 23, 2017

(86) PCT No.: PCT/EP2017/051331
§ 371 (c)(1),
(2) Date: Jul. 24, 2018

(87) PCT Pub. No.: WO2017/129525
PCT Pub. Date: Aug. 3, 2017

(65) Prior Publication Data
US 2019/0030772 A1 Jan. 31, 2019

(30) Foreign Application Priority Data
Jan. 25, 2016 (IE) .................... 2016/0032

(51) Int. Cl.
| B29C 45/14 | (2006.01) |
| A46B 3/04 | (2006.01) |
| A46B 3/06 | (2006.01) |
| A46B 9/02 | (2006.01) |
| A46B 9/04 | (2006.01) |
| A46D 3/00 | (2006.01) |

(Continued)

(52) U.S. Cl.
CPC .......... *B29C 45/14065* (2013.01); *A46B 3/04* (2013.01); *A46B 3/06* (2013.01); *A46B 9/026* (2013.01); *A46B 9/04* (2013.01); *A46D 3/005* (2013.01); *A61C 17/222* (2013.01); *B29C 45/14016* (2013.01); *B29C 45/14311* (2013.01); *B29C 45/14385* (2013.01); *A46B 2200/1066* (2013.01); *B29L 2031/425* (2013.01)

(58) Field of Classification Search
None
See application file for complete search history.

(56) References Cited

U.S. PATENT DOCUMENTS

| 2,317,110 A | 4/1943 | Person |
| 2,706,825 A | 4/1955 | Blakeman |

(Continued)

FOREIGN PATENT DOCUMENTS

AU 2008238265 A1 10/2008

*Primary Examiner* — Jacob T Minskey
*Assistant Examiner* — Adrianna N Konves
(74) *Attorney, Agent, or Firm* — Roshni A. Sitapara

(57) ABSTRACT

A mould system for producing a tufted body having a curved outer surface, for example one hemispherical half of a spherical toothbrush head, the mould system comprising a mould form having a receptacle and an annular flange circumscribing an open end of the receptacle and at least one slot formed substantially radially in the flange and extending into a sidewall of the receptacle.

4 Claims, 5 Drawing Sheets

(51) Int. Cl.
*A61C 17/22* (2006.01)
*B29L 31/42* (2006.01)

(56) References Cited

U.S. PATENT DOCUMENTS

| | | | |
|---|---|---|---|
| 3,408,112 A | * | 10/1968 | Piotrowski ............. A46D 3/005 |
| | | | 300/21 |
| 4,291,431 A | | 9/1981 | Lewis, Jr. |
| 2010/0132140 A1 | | 6/2010 | Diamond |
| 2013/0055515 A1 | | 3/2013 | Diamond |
| 2013/0326834 A1 | | 12/2013 | Vankov et al. |
| 2014/0173839 A1 | | 6/2014 | Henderson |
| 2015/0097309 A1 | | 4/2015 | Newman |

* cited by examiner

SYSTEM AND METHOD FOR MOULDING A TUFTED BODY WITH A CURVED OUTER SURFACE

This application is a 371 of International Application No. PCT/EP2017/051331, filed Jan. 23, 2017, which claims the priority of IE S2016/0032 filed Jan. 25, 2016.

FIELD OF THE INVENTION

This invention relates to a system and method of moulding a tufted body having a curved outer surface such as a hemisphere or the like, and in particular a method of injection moulding a tufted hemisphere that may be employed as a rotatable brush head, and most particularly as an electric toothbrush head or part thereof.

BACKGROUND OF THE INVENTION

Brushes and brush heads are used in an almost endless array of applications, ranging in size, shape, material, along with bristle size, shape and arrangement. One issue that arises in the manufacture and use of brush heads is the manner in which the bristles, which are normally arranged in tufts, are located and secured in the brush head. There are numerous ways to embed the tufts of bristles, which can vary depending on the type of material from which the bristles are made, the application to which the brush is to be employed, which may require a certain level of bristle retention, in addition to the size and/or shape constraints imposed by the brush head itself.

Bristle location and retention become increasing difficult as the size of the brush head reduces, due to a reduction in the overall material forming the head and which may be used to secure the bristles, in addition to a reduction in the amount of available surface area on the head from which the bristles may project. Finally, the shape of the head may impose further restrictions or difficulties in inserting and retaining the bristles. This is particularly relevant when seeking to produce a brush head whose surface, from which the tufts of bristles project, is curved, for example spherical or hemispherical.

It is therefore an object of the present invention to provide a system and method for moulding a tufted body having a curved outer surface, for example a hemisphere, which system and method addresses some of the above issues.

SUMMARY OF THE INVENTION

According to a first aspect of the present invention there is provided a mould system for producing a tufted body having a curved outer surface, the mould system comprising a mould form having a receptacle and an annular flange circumscribing an open end of the receptacle; and at least one slot formed substantially radially in the flange and extending into a sidewall of the receptacle.

Preferably, the receptacle is hemispherical.

Preferably, the mould system comprises an array of the slots distributed about the flange.

Preferably, the mould system comprises an array of apertures in the receptacle.

Preferably, the apertures are arranged to provide a moulded body from which tufts project at various orientations.

Preferably, the apertures are arranged in rows disposed circumferentially about the receptacle.

Preferably, the apertures are arranged in at least two circumferentially extending parallel rows, a first row proximal the flange and a second row distal the flange.

Preferably, at least some of the slots are arranged and dimensioned to be coincident with one or more of the apertures.

Preferably, at least some of the slots are arranged and dimensioned to be coincident with an aperture in the first row and an aperture in the second row.

Preferably, the flange extends radially outwardly from a rim of the receptacle.

Preferably, the mould system comprises one or more retention members releasably engagable with the mould form in order to retain tufts in position relative to the mould form.

Preferably, the mould system comprises at least one retention member associated with one or more of the rows of apertures.

Preferably, the mould system comprises a pair of opposed retention members associated with one or more of the rows of apertures.

Preferably, each retention member is adapted to retain a tuft against a radially inner end of a respective slot.

Preferably, each retention member comprises an abutting end which is shaped and dimensioned for a complimentary fit against the receptacle.

Preferably, each retention member is adapted to be displaceable between a disengaged position permitting tufts to be inserted into the receptacle via the slots and/or apertures, and an engaged position retaining tufts at desired locations and/or orientations projecting outwardly from the receptacle.

According to a second aspect of the present invention there is provided a method of moulding a tufted body having a curved outer surface, the method comprising the steps of: inserting one or more tufts into a receptacle of a mould form such that each tuft projects outwardly from the receptacle; forming a moulded body within the receptacle in which body at least a portion of each tuft is embedded for retention; and removing the tufted body from the mould form.

Preferably, the method comprises consecutively moulding multiple tufted bodies, wherein the tufts are supplied in continuous form from one moulding to the next, the step of removing a tufted body from the mould form drawing a further portion of tufts into the receptacle for the next moulding.

Preferably, the mould form comprises a flange circumscribing an open end of the receptacle and having one or more slots formed in the flange and extending into the receptacle, the method comprising allowing a tuft to pass through each slot as the tufted body is removed from the receptacle.

Preferably, the method comprises melting the portion of the tufts located within the receptacle to at least partially form the moulded body.

Preferably, the method comprises injecting a polymer into the receptacle in order to at least partially form the moulded body.

Preferably, the method comprises retaining at least some of the tufts in a predefined location while the moulded body is formed.

As used herein, the term "tufted" is intended to mean that an object or body has an array of tufts of bristles or the like projecting from an outer surface of the body, such as to form a brush like arrangement.

BRIEF DESCRIPTION OF THE DRAWINGS

The present invention will now be described with reference to the accompanying drawings, in which.

DETAILED DESCRIPTION OF THE INVENTION

Referring now to the accompanying drawings, there is illustrated a mould system, generally indicated as 10, for producing a tufted body B having a curved outer surface from which an array of tufts T project, the tufted body B being, in a preferred embodiment, hemispherical in shape for use as a brush head or part thereof for an electric toothbrush or the like. The mould system 10 and accompanying methodology may however be utilised to produce tufted bodies of various shape and/or size, as will become apparent from the following description of the configuration and operation of the mould system 10.

Figure 5:
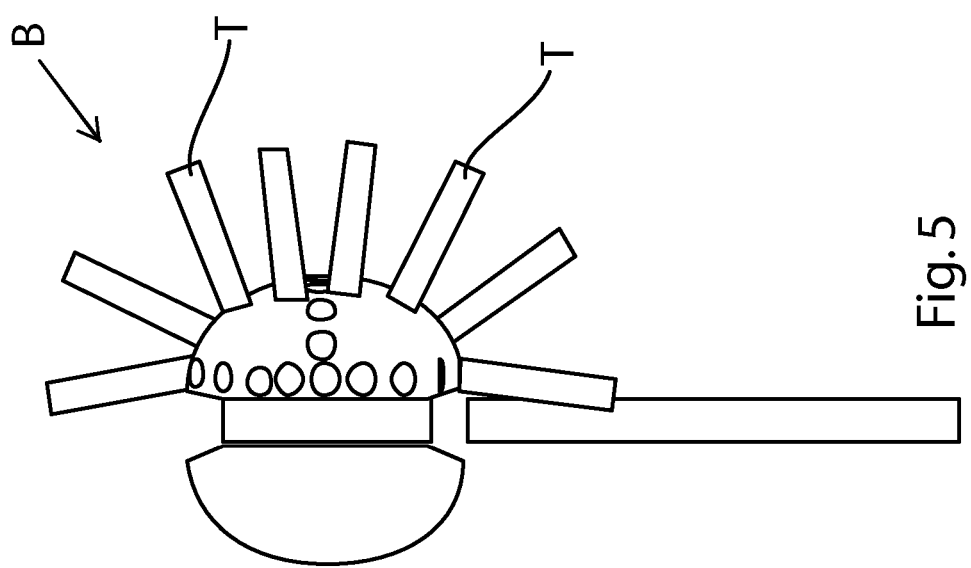
FIG. 5 illustrates a brush head formed with a tufted hemisphere as produced with the system and method of the invention.

The mould system 10 comprises a mould form 12 to be used in producing the tufted body B, preferably by means of injection moulding as described hereinafter, the body B taking the form, in the embodiment illustrated, of a hemispherical brush head as illustrated in FIG. 5. The body 12 thus has the array of tufts T projecting outwardly therefrom and the body B can then be driven, mechanically or electrically, about a central axis in order to effect a continuous brushing motion. The mould form 12 comprises two main components, a hollow receptacle 14 which defines the shape of the tufted body B, and in the embodiment illustrated is hemispherical in form, and an annular flange 16 which extends radially outwardly from an open end or rim of the receptacle 14.

In order to allow the array of tufts T to be captured within the tufted body B the receptacle 14 is provided with an array of apertures arranged in rows 18, 20, 22, 24 therein, the functionality of which will be described in greater detail hereinafter. In the embodiment illustrated it is desired to provide the tufts T in an array of rows about the body B, and thus the apertures are provided as a first row 18 immediately adjacent the flange 16, a second row 20 beyond the first row 16, a third row 22 beyond the second row 20, and an uppermost row 24. Each of the apertures in the rows 18, 20, 22, 24 are preferably angled or aimed towards a centre of the hemisphere defined by the receptacle 14, such that each of the tufts T, when inserted into the apertures 18, 20, 22, 24 will project substantially normally from the outer surface of the tufted body B in order to provide a substantially even distribution of the tufts T about the exterior of the body B as illustrated in FIG. 5. It will however be appreciated that the apertures 18, 20, 22, 24 may be arranged in any other desired configuration and orientation in order to provide a desired arrangement of the tufts T about the body B.

Figure 1:
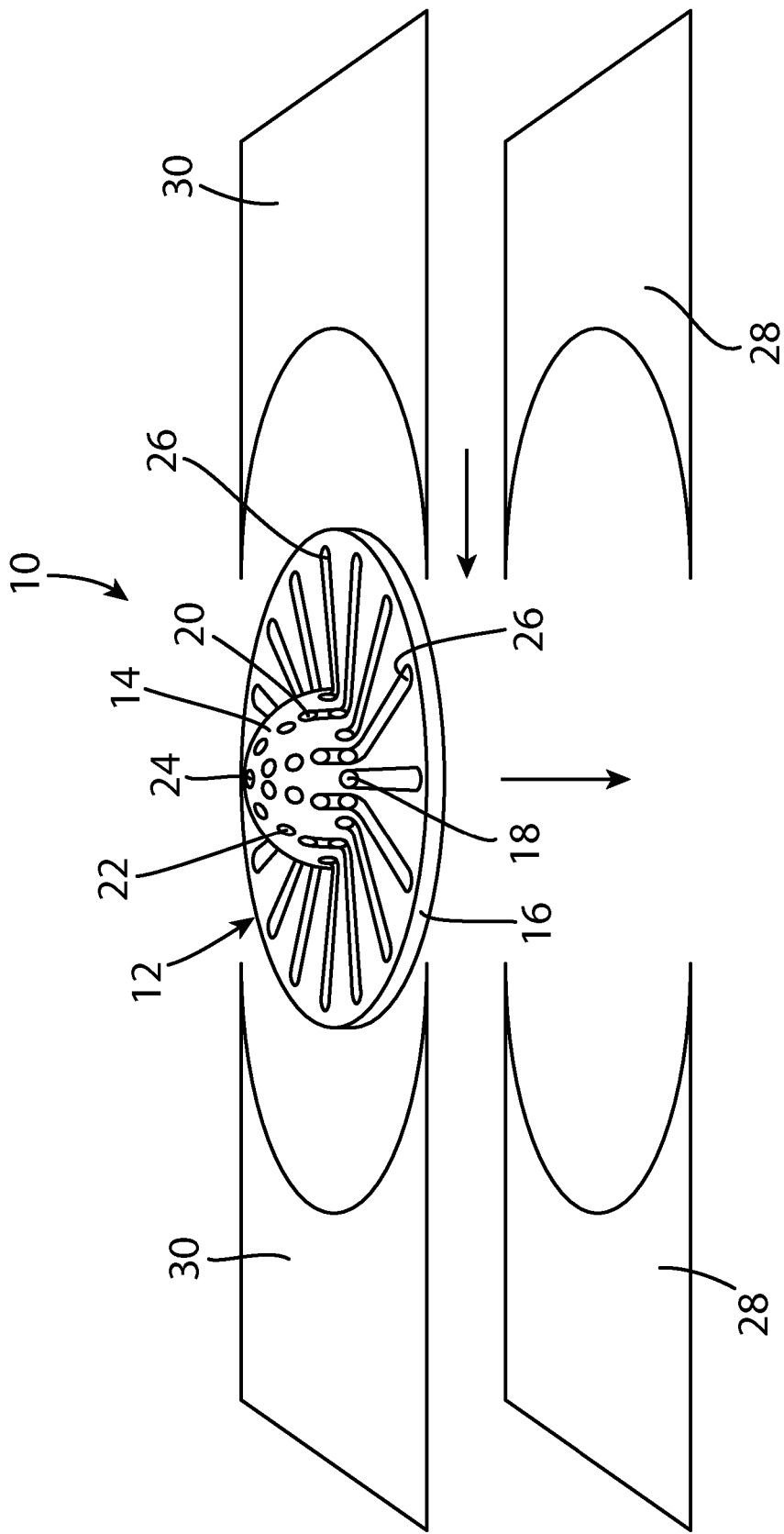
FIG. 1 illustrates a perspective view of a moulding system according to a preferred embodiment of the invention.
Figure 2:
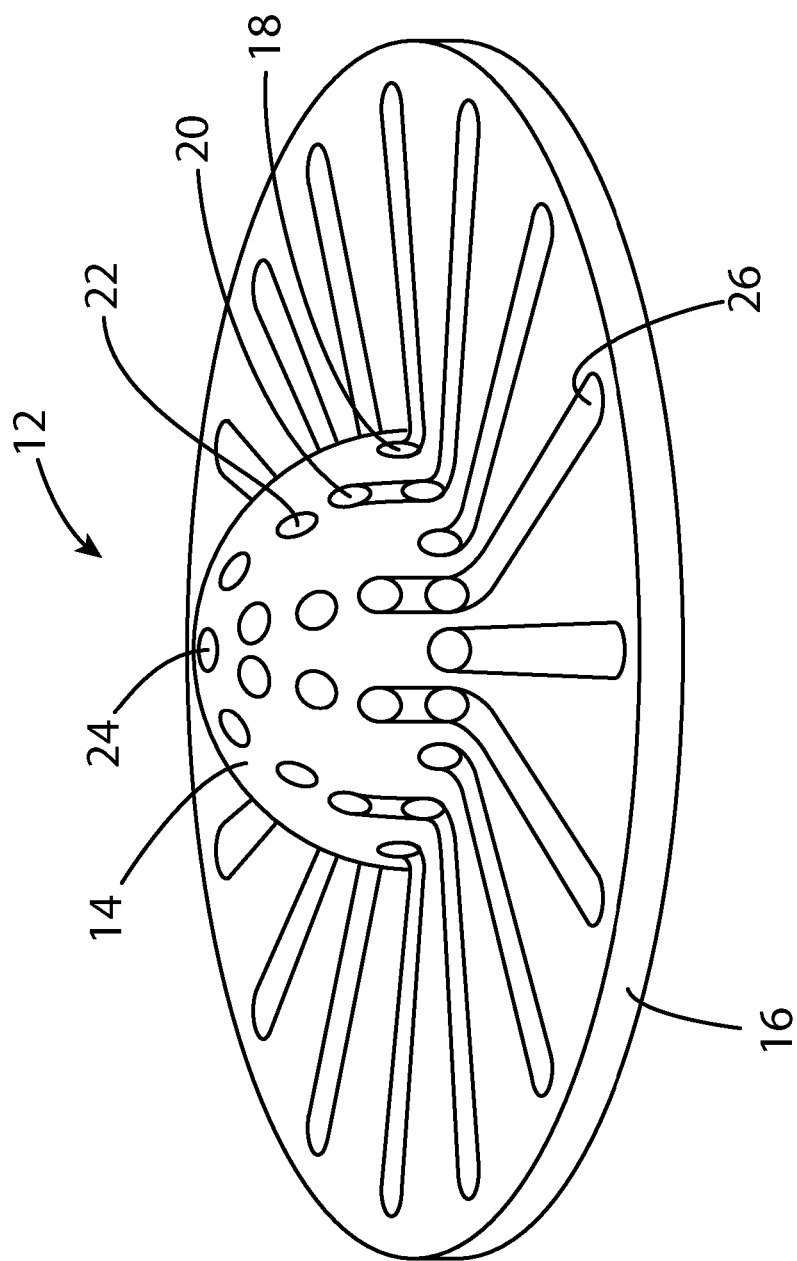
FIG. 2 illustrates a perspective view of a mould form which is a component part of the mould system illustrated in FIG. 1.
Figure 3:
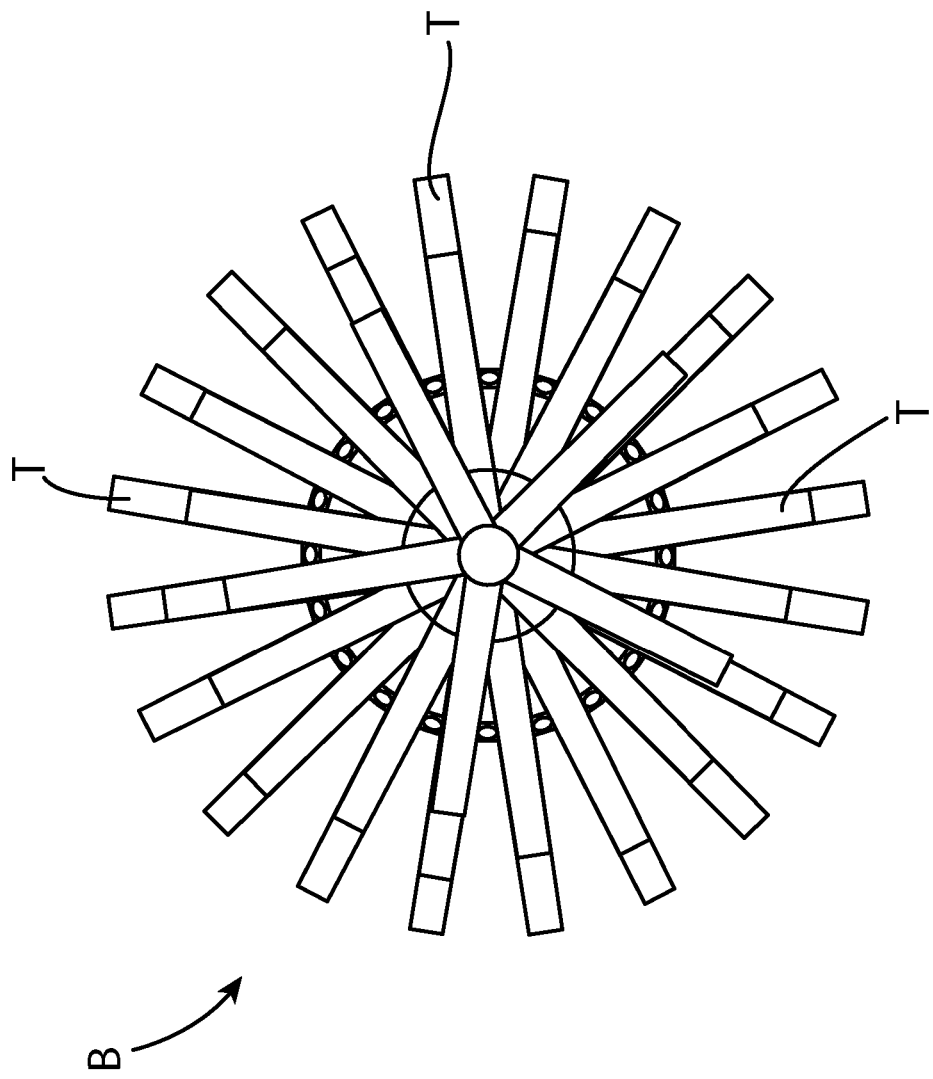
FIG. 3 illustrates a schematic representation of the configuration of an array of tufts as inserted into a hollow receptacle of a mould form which is part of the mould system of the invention.
Figure 4:
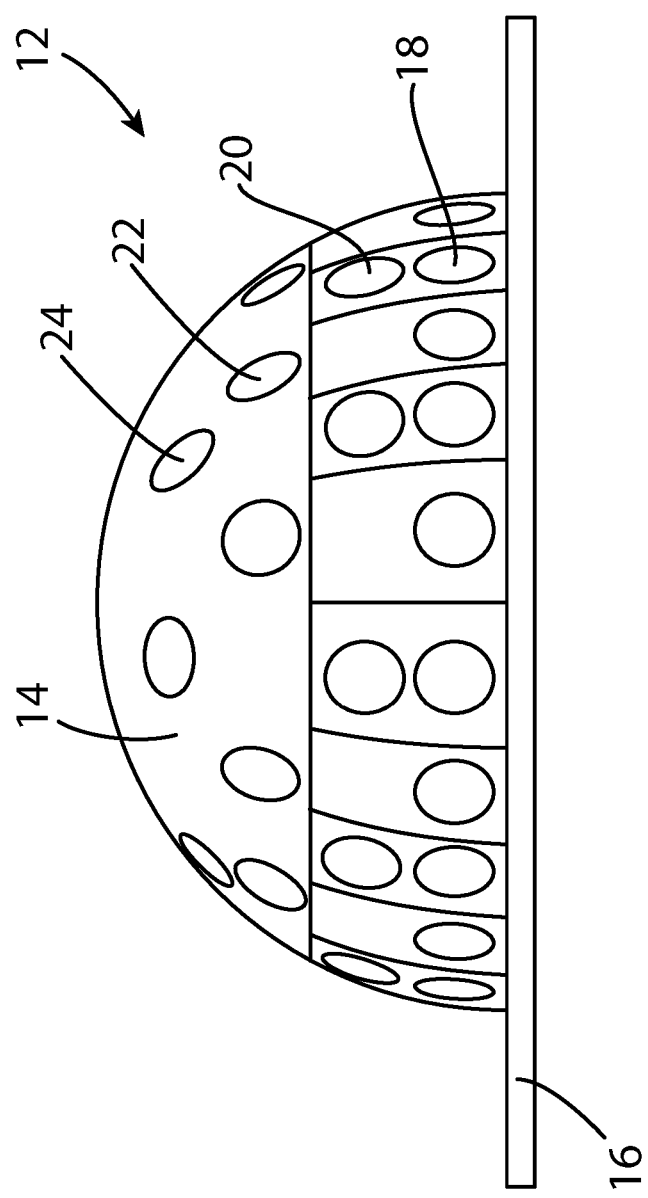
FIG. 4 illustrates a schematic side elevation of the mould form shown in FIG. 2.

In order to facilitate both the insertion and subsequent removal of the tufts T, in particular from the first row 18 and second row 20 of apertures, the flange 16 comprises an array of slots 26 extending radially outwardly from the receptacle 14, at least some of the slots 26 being coincident with apertures in the first row 18, while at least some of the other slots 26 are coincident with apertures in the second row 20, as can be seen for example in FIGS. 1 and 2, and as will be described in detail hereinafter.

Turning then to the operation of the mould system 10, the mould form 12 is located in a suitable moulding apparatus (not shown), preferably but not essentially with the flange 16 lying in a substantially horizontal plane and the receptacle 14 curving upwardly from the flange 16, as orientated in FIG. 1. The mould system 10 further comprises retention members in the form of an opposed pair of first retention members 28 and an opposed pair of second retention members 30 vertically spaced above the first retention members 28 with respect to the described orientation of the mould system 10. The retention members 28, 30 are positioned with one member 28, 30 on opposed sides of the mould form 12 and are displaceable between a disengaged state as illustrated in FIG. 1, in which the mould form 12 is fully accessible, and an engaged position in which the retention members 28, 30 abut against the exterior of the receptacle 14, preferably in the region of the first row 18 and second row 20 of apertures as hereinafter described.

The moulding process begins with locating the retention members 28, 30 in the disengaged position as illustrated in FIG. 1, and inserting a tuft T into each of the apertures of the rows 18, 20, 22, 24. The tufts T are preferably dimensioned in length to pass into the interior of the receptacle 14 and extend outwardly from the lower open end thereof, while also projecting the required distance outwardly from each of the apertures 18, 20, 22, 24 in order to define the tufts T of bristles in the finished tufted body B. When inserting the tufts T into the apertures of the first row 18 and second row 20 the tufts may be initially inserted in a outer region of the slots 26 and the tufts T then displaced radially inwardly towards the respective aperture 18, 20 with which the slot 26 is coincident, whether in the first row 18 or second row 20.

At this point the pair of second retention members 30 are displaced into the engaged position abutting against the exterior of the receptacle 14, and preferably immediately beneath the apertures of the second row 20. As the abutting end of the retention members 28, 30 are shaped to closely conform to the exterior of the receptacle 14, the second retention members 30 will thus effectively form a thin ring surrounding the receptacle 14 immediately below the apertures in the second row 20, and will therefore act to retain the respective tufts T in register with those apertures of the second row 20, preventing the tufts T from migrating back down along the corresponding slots 26. With the second retention members 30 in the engaged position, the first retention members 28 can then be advanced into the engaged position abutting against the exterior of the receptacle 14, immediately beneath the apertures in the first row 18. Similar to the second retention members 30, the first retention members 28 will hold the tufts T in position in the apertures of the first row 18, preventing migration along the respective slots 26.

At this point all of the tufts T are retained in the desired position and orientation, in order to allow moulding of the body B. The body B may be formed by melting the portion of the tufts T located within the receptacle 14, and optionally that length of tufts T extending downwardly from the open end of the receptacle 14. It may also be necessary or desirable, depending on the suitability of the material from which the tufts T are manufactured, to injection mould additional polymer material (not shown) into the receptacle 14 in order to form the body B. If the tufts T within the receptacle 14 are not melted to form part of the mass of the body B, the additional length of tufts T extending downwardly from the open end of the receptacle 14 are severed or otherwise removed. Once the molten polymer within the receptacle 14 has cooled and hardened the tufted body B can then be removed from the mould form 12.

This process involves firstly withdrawing the retention members 28, 30 into the disengaged state, and then effecting relative vertical displacement between the tufted body B and the mould form 12 in order to release the tufted body B. As the tufts projecting outwardly through the apertures in the third row 22 and fourth row 24 have a significant vertical component of their orientation they will, with minor resilient deformation, pass unhindered through the respective aperture 22, 24 as the mould form 12 and tufted body B are separated from one another. However, the tufts T projecting from the first row 18 and second row 20 have a significant horizontal or radially extending component relative to the receptacle 14, but are nevertheless permitted to pass through the mould form 12 by means of the slots 26. As the slots 26 extend upwardly into the apertures of both the first row 18 and the second row 20 the corresponding tufts T can pass downwardly from the respective aperture into the associated slot 26 as the mould form 12 and tufted body B are vertically separated from one another. Thus the tufted body B can be separated from the mould form 12 without complication.

If, as would be the case in a commercial moulding process, it is intended to consecutively mould multiple tufted bodies B, the above process can be slightly modified in order to facilitate a more efficient moulding process. The tufts T fed into the various rows of apertures 18, 20, 22, 24 may be fed in continuous form, for example from a number of spools (not shown) of the tuft material, and remain strung to the spool as the body B is moulded. As a result, the act of ejecting that moulded body B from the mould form 12 will draw a fresh length of the tufts T off the spools or other store (not shown) into the interior of the receptacle 14 in preparation for moulding the next body B. The process can be repeated continually.

It will therefore be appreciated that the mould system 10 and corresponding method of moulding of the present invention permit a tufted body B having a curved outer surface to be quickly and easily moulded and released, in order to produce what would otherwise be a relatively complex moulded tufted body B.

The invention is not limited to the embodiment described herein but can be amended or modified without departing from the scope of the present invention.

The invention claimed is:

1. A method of moulding a tufted body having a curved outer surface, the method comprising the steps of:
   inserting one or more tufts from one or more spools into a receptacle of a mould form such that each tuft projects outwardly from the receptacle;
   forming a moulded body within the receptacle in which at least a portion of each tuft is embedded for retention, wherein the one or more tufts remain strung to the one or more spools as the moulded body is moulded; and
   removing the tufted body from the mould form, wherein the step of ejected the tufted body from the mould form draws a fresh length of tufts from the spools into the interior of the receptable for the next moulding thereby consecutively moulding multiple tufted bodies,
   wherein the mould form comprises a flange circumscribing an open end of the receptable and having one or more slots formed in the flange and extending into the receptacle, the method comprising allowing a tuft to pass through each slot as the tufted body is removed from the receptacle.

2. The method of claim 1 comprising the step of melting the portion of the tufts located within the receptacle to at least partially form the moulded body.

3. The method of claim 1 comprising the step of injecting a polymer into the receptacle in order to at least partially form the moulded body.

4. The method of claim 1 comprising the step of retaining at least some of the tufts in a predefined location while the moulded body is formed.

* * * * *